(12) United States Patent
Takada et al.

(10) Patent No.: US 8,771,872 B2
(45) Date of Patent: Jul. 8, 2014

(54) NEGATIVE-ELECTRODE MATERIAL AND LITHIUM SECONDARY BATTERY USING SAME

(75) Inventors: Kazunori Takada, Ibaraki (JP); Bui Thi Hang, Ibaraki (JP); Tsuyoshi Ohnishi, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 15 days.

(21) Appl. No.: 13/319,589

(22) PCT Filed: May 13, 2010

(86) PCT No.: PCT/JP2010/058110
§ 371 (c)(1),
(2), (4) Date: Nov. 9, 2011

(87) PCT Pub. No.: WO2010/131709
PCT Pub. Date: Nov. 18, 2010

(65) Prior Publication Data
US 2012/0064400 A1 Mar. 15, 2012

(30) Foreign Application Priority Data
May 14, 2009 (JP) .................................. 2009-117114

(51) Int. Cl.
*H01M 4/02* (2006.01)

(52) U.S. Cl.
USPC ....... 429/209; 429/231.95; 429/322; 429/319

(58) Field of Classification Search
USPC ................................ 429/209, 231.95, 322.319
See application file for complete search history.

(56) References Cited

U.S. PATENT DOCUMENTS 635,279 A * 10/1899 Takada .......................... 404/132

(Continued)

FOREIGN PATENT DOCUMENTS

| EP | 2 204 867 | 7/2010 | ............. H01M 4/38 |
|---|---|---|---|
| JP | 2006244813 A | 9/2006 | |
| JP | 2007019032 A | 1/2007 | |
| WO | WO 2009/031715 | 3/2009 | ............. H01M 4/38 |

OTHER PUBLICATIONS

JP2006-6244813 MT.*
JP 2006-244813 machine translation.*
Hang et all Journal of Power Sources ,2010, 195 3323-3327.*
P. Poizot et al., (2000) "Nano-sized transition-metal oxides as negative-electrode materials for lithium-ion batteries", Nature 407, pp. 496-499.

(Continued)

*Primary Examiner* — Patrick Ryan
*Assistant Examiner* — Alex Usyatinsky
(74) *Attorney, Agent, or Firm* — Harness, Dickey & Pierce, P.L.C.

(57) ABSTRACT

An embodiment of the present application aims at providing a material which repeatedly undergoes a conversion reaction and an alloying reaction to have an improved columbic efficiency in a first cycle of the repeating, and thereby allowing the material to serve as a high-electrical capacity negative electrode of a lithium secondary battery. In order to attain the object, a negative-electrode material is made by mixed dispersion of (i) nanoparticles of an electrical conducting material having electronic conduction and (ii) nanoparticles of an electrode active material which is reducible to a simple substance which undergoes an alloying reaction with lithium. The electrical conducting material is a sulfide having electronic conduction, and the electrode active material is a sulfide of an element which undergoes the alloying reaction with lithium. Further, the element which undergoes the alloying reaction with lithium is silicon.

5 Claims, 4 Drawing Sheets

(56) References Cited

U.S. PATENT DOCUMENTS

| | | | |
|---|---|---|---|
| 6,352,796 B1* | 3/2002 | Takada et al. | 429/231.1 |
| 2003/0175585 A1 | 9/2003 | Ugaji et al. | 429/162 |
| 2005/0170250 A1* | 8/2005 | Ohzuku et al. | 429/231.1 |
| 2007/0072084 A1* | 3/2007 | Nishie | 429/324 |
| 2009/0162750 A1 | 6/2009 | Kawakami et al. | 429/218.1 |
| 2012/0321949 A1 | 12/2012 | Kawakami et al. | 429/211 |

OTHER PUBLICATIONS

Y. Idota et al., (1997). "Tin-Based Amorphous Oxide: A High-Capacity Lithium-Ion Storage Material", Science, 276, pp. 1395-1397.

T. Brousse et al., (1998). "Composite negative electrodes for lithium ion cells", Solid State Ionics, 113-115, pp. 51-56.

European Search Report dated Jan. 7, 2013 issued in EP Application No. 10774966.5.

* cited by examiner

NEGATIVE-ELECTRODE MATERIAL AND LITHIUM SECONDARY BATTERY USING SAME

TECHNICAL FIELD

The present invention relates to (i) a negative-electrode material for a lithium battery whose charge and discharge are carried out by an alloying reaction with lithium, and to (ii) a lithium battery using the negative-electrode material.

BACKGROUND ART

Lithium batteries are used as power sources for portable phones, notebook PCs, etc. Thus, the lithium batteries are important devices which support advanced information society of today. Power consumption in such portable electronic devices shows a significant increase due to increase in information processing amount the portable electronic devices should deal with. Accordingly, there is a persistent demand for greater energy density of lithium batteries which are power sources of the portable electronic devices.

On the other hand, realization of environment-friendly society is a global-scale urgent issue. For this purpose, more efficient energy utilization and use of renewable energy have been carried on. One of such measures is use of electric vehicles. However, it is said that an energy density several times higher than that of an existing lithium-ion battery is required in order that an electric vehicle is realized. Accordingly, increasing energy densities of lithium batteries is an important issue in such a field too.

A lithium-ion battery which is a most prevalent lithium battery is a combination of a graphite negative electrode and a $LiCoO_2$ positive electrode. As long as this combination is employed, it is difficult to further increase energy density from the current level. In order to meet the aforementioned social demands, there is an urgent need for development of a new electrode material having an electrical capacity higher than those of such conventional electrode materials.

Candidate materials for a high-electrical capacity negative electrode of a lithium battery have been already known by learning their electrochemical equivalents which are calculated from (i) how much atomic weight or molecular weight the materials have and (ii) how many electrons participate in an electrode reaction. Lithium metal, a lithium alloy, etc. are such conventionally known candidate materials. Other than such classically-known negative-electrode materials, Tarascon et al, proposed a conversion electrode which is a high-electrical capacity negative electrode based on a new concept (see Non-patent Literature 1).

The conversion reaction is such a reaction that a metal oxide such as CoO or NiO is electrochemically reduced in a lithium battery so that metal fine particles such as cobalt fine particles or nickel fine particles are generated from the metal oxide.

The conversion reaction is reversible. For example, in a case where a metal atom is cobalt, the conversion reaction is as follows, for example: $CoO+2e^-+2Li^+ \leftrightarrow Co+Li_2O$; or $Co_3O_4+8e^-+8Li^+ \leftrightarrow 3Co+4Li_2O$. These reactions respectively yields such great capacities of 715 $mAh \cdot g^{-1}$ and 891 $mAh \cdot g^{-1}$.

Metal elements disclosed in Non-Patent Literature 1 are cobalt, nickel, copper, and iron only. If a metal element which can be alloyed with lithium is employed instead of these metal elements, an alloying reaction follows the conversion reaction in the reduction reaction in the lithium battery. It is expectable that this configuration can yield a further great electrical capacity. Non-patent Literature 2 proposes to produce the negative electrode of the lithium battery from tin oxide as the metal oxide which forms a lithium alloy as described above. In this case, reactions which repeatedly take place are the alloying reaction and the dealloying reaction only, and the conversion reaction occurs only in a first reduction process. This phenomenon observed in the conversion reaction of an oxide can be observed in a conversion reaction of a sulfide. In a first reduction process of $SnS_2$, a generation reaction of tin as a simple substance is observed at 0.8 V with reference to a lithium electrode. However, a re-oxidation reaction corresponding to the reduction reaction is not observed (Non-patent Literature 3). That is, although it is conventionally known that the combination of the conversion reaction and the alloying reaction would possibly serve as a high-electrical capacity negative electrode reaction, there has been no report that these reactions are repeatedly caused to realize such a negative electrode reaction with a high electrical capacity density.

An electrical capacity of the conversion reaction yields is determined by how many electrons take part in the reaction converting a compound to a metal. An electrical capacity of the alloying reaction is determined by how much lithium in the composition is available for the formation of the lithium alloy. A highest electrical capacity density can be expected in a case where a silicon compound is employed. However, there has been no proposal of a negative electrode utilizing (i) a conversion reaction of a silicide and (ii) a subsequent alloying reaction with lithium.

The inventors of the present invention found that the reason why the combination of the conversion reaction of a sulfide of silicon and the subsequent alloying reaction with lithium is not employed as the negative electrode reaction in the lithium battery is an extremely poor repeatability of the conversion reaction and the alloying reaction.

This is explained below, referring to the case of an electrode reaction of silicon sulfide for example. In this case, a charge reaction of the negative electrode made from silicon sulfide is a reduction process starting from silicon sulfide. In this process, silicon sulfide is converted to an elemental silicon by the conversion reaction, and further converted to a lithium-silicon alloy by the alloying reaction. In a following discharging of the lithium battery, the lithium-silicon alloy generated in the charging process is supposed to be re-oxidized to be converted back to the elemental silicon, and further to silicon sulfide. However, although the generation reaction of elemental silicon and the generation reaction of the lithium-silicon alloy take place in the first reduction process, only the dealloying reaction take place in the subsequent re-oxidation process. Furthermore, a coulombic efficiency is extremely low which is a ratio of an electrical capacity in the first reduction process to an electrical capacity in the first re-oxidation process (hereinafter, a coulombic efficiency for the first reduction process and the first re-oxidation process is referred to as first-cycle coulombic efficiency). The coulombic efficiency is not sufficient for a high-electrical capacity negative electrode of a rechargeable lithium secondary battery.

Citation List
  Non-Patent Literatures
  Non-Patent Literature 1
  P. Poizot, S. Laruelle, S. Grugeon, L. DUPONT and J.-M. Tarascon, Nature 407, pp. 496-499 (2000).
  Non-Patent Literature 2
  Y. Idota, T. Kubata, A. Matsufuji, Y. Maekawa and T. Miyasaka, Science, 276, pp. 1395-1397 (1997).
  Non-Patent Literature 3
  T. Brousse, S. M. Lee, L. Pasquereau, D. Defives and D. M. Schleichi, Solid State Ionics, 113-115, pp. 51-56 (1998).

SUMMARY OF INVENTION

Technical Problem

The present invention aims at allowing a material which repeatedly undergoes a conversion reaction and an alloying reaction to have an improved coulombic efficiency in a first cycle of the repeating, and thereby allowing the material to serve as a high-electrical capacity negative electrode of a lithium secondary battery.

Solution to Problem

A negative-electrode material of the present invention is a mixture material obtained by solidifying a mixed vapor of (i) an electrical conducting material having electronic conduction and (ii) an electrode active material which is reducible to a simple substance which undergoes an alloying reaction with lithium.

A lithium secondary battery of the present invention is a lithium secondary battery including: a negative electrode; a positive electrode; and a lithium-ion conducting electrolyte being provided between said negative electrode and said positive electrode, said negative electrode being made from a negative-electrode material of the present invention.

A method of the present invention for producing a negative-electrode material is a method for producing the negative-electrode material of the present invention, and the method includes the steps of: vaporizing the mixture of (i) the active material and (ii) the electrical conducting material having electronic conduction; and solidifying the mixture thus vaporized.

Advantageous Effects of Invention

The present invention realizes repetition of a conversion reaction and an alloying reaction which repetition is heretofore considered to be impossible. In addition, the present invention realizes the repetition with a high repeatability. Furthermore, the present invention makes it possible to manufacture a negative electrode concurrently with production of the negative-electrode material of the present invention. This makes it possible to improve efficiency in manufacture of a negative electrode made from the negative-electrode material of the present invention.

DESCRIPTION OF EMBODIMENTS

Figure 1:
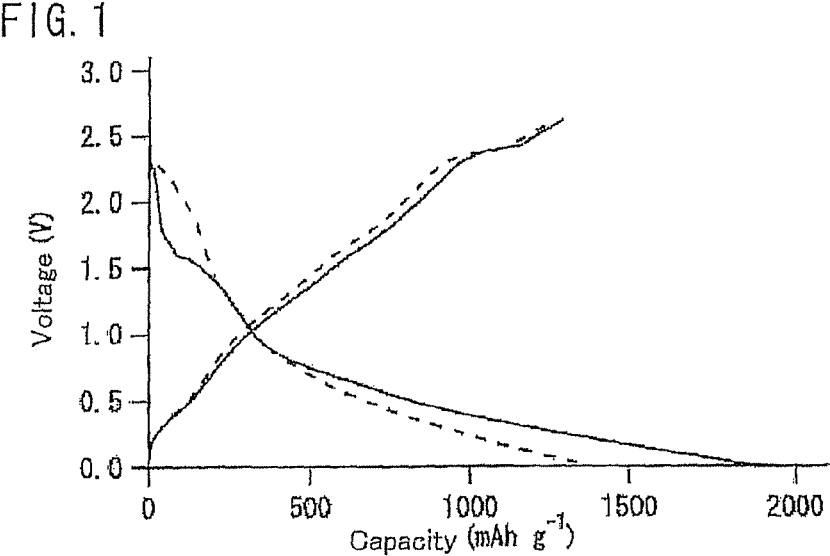
FIG. 1 shows charge and discharge curves of a negative-electrode material of Example 1 of the present invention.

A negative-electrode material of the present invention is a complex of (i) a substance which repeatedly undergoes a conversion reaction and an alloying reaction so as to serve as a high-electrical capacity electrode active material and (ii) a substance having electronic conduction.

The substance which repeatedly undergoes the conversion reaction and the alloying reaction so as to serve as the high-electrical capacity electrode active material is a compound which undergoes a conversion reaction to generate a simple substance which undergoes an alloying reaction with lithium. In the conversion reaction, the simple substance and a lithium compound are generated.

In a case where the element which undergoes the alloying reaction with lithium is, e.g., silicon, electrode active materials which repeatedly undergo a conversion reaction and an alloying reaction may be silicon oxide or silicon sulfide, for example. In a case where the electrode active material is silicon oxide, generated are an elemental silicon and an oxide of lithium. In a case where the electrode active material is silicon sulfide, generated are the elemental silicon and a sulfide of lithium. That is, each of the electrode active materials changes to a complex of the elemental silicon and a lithium compound. In order that the alloying reaction of lithium takes place following the conversion reaction, the whole complex exhibits lithium ionic conduction so that lithium can be introduced into the complex. The sulfide of lithium has a higher ion conductivity than the oxide of lithium. Accordingly, a substance which serves as the electrode active material is preferably a sulfide of an element which undergoes the alloying reaction with lithium.

As the substance having electronic conduction, it is possible to employ various electron-conductive substances such as metals, carbon materials, oxides, etc. However, in a case where, e.g., silicon sulfide is employed as the substance which serves as the electrode active material, and aluminum is employed as the substance having electronic conduction, there is a possibility that silicon sulfide and aluminum reacts with each other when solidified from a gaseous state. This reaction produces the elemental silicon and aluminum sulfide. If such a reaction occurs so that aluminum having electronic conduction is changed to aluminum sulfide having an electron insulation property, it becomes difficult to achieve the effect of the present invention.

In other words, in a case where a metal or an oxide is employed as a substance having electronic conduction, there is a possibility that in a process of being solidified from a gaseous state, a substance which serves as the electrode material and the substance having electronic conduction change in quality, so that their respective innate properties are lost. This indicates that both substances chemically react with each other, so that their respective functions are lost. In a case where sulfides are employed as the substance which serves as the electrode material and the substance having electronic conduction, such a chemical reaction is unlikely to occur. Accordingly, it is preferable to employ a sulfide as the substance having electronic conduction.

It follows that an electrical conducting material (substance having electronic conduction) and an electrode active material for the negative-electrode material of the present invention may be any materials, provided that the materials do not chemically react with each other even in a vapor state. On the basis of such knowledge, in the present invention, the negative-electrode material is not a compound but a mixture.

Examples of elements which can be employed as the element which undergoes the alloying reaction with lithium encompass elements which are conventionally known to undergo the alloying reaction with lithium, such as aluminum, gallium, germanium, tin, lead, and antimony. However, in order to increase an electrical capacity density, it is preferable to employ an element which (i) has a large number of reaction electrons in the conversion reaction, (ii) can form an alloy phase with a large quantity of lithium, and (iii) has a small atomic weight. Accordingly, it is most preferable to employ silicon which satisfies these conditions.

In order to vaporize a mixture of (i) a sulfide of an element which undergoes the alloying reaction with lithium and (ii) a sulfide having electronic conduction, various methods for giving energy such as heat or a high frequency wave to the mixture can be employed. A most simple method for vaporizing a solid substance is a method for heating the solid substance so as to give energy in the form of thermal energy to the solid substance. In a case where there is a large difference in boiling point or in vapor pressure at high temperature between a substance which serves as the electrode active material and a substance which serves as the electrical conducting material, a difference in vaporization rate between the substances causes a significant change in composition between the mixture before the vaporization and the negative-electrode material after the vaporization. Accordingly, the method for vaporizing the mixture is preferably a method which causes a temperature rise of the mixture as small as possible. Specifically, pulse laser ablation is preferably employable.

In a case where the mixture of the electrode active material and the electrical conducting material is vaporized by pulse laser ablation, it is preferable to (i) employ, as an ambient gas in ablation, a gas which is inactive with the electrode active material and with the electrical, conducting material, and (ii) employ an ambient pressure of not higher than $10^{-2}$ Pa, although the present invention is not particularly limited to these conditions (i) and (ii).

That is, in a case where the ambient gas in ablation is reactive with the electrode active material or the electrical conducting material, e.g., in a case where the ambient gas is oxygen, a negative-electrode material to be obtained can be an oxide, even if a sulfide active material or a sulfide electrical conducting material is employed. In this case, the negative-electrode material cannot achieve a desired capability.

In addition, in a case where an ambient pressure is high, an evaporated species caused by the ablation is dispersed by the ambient gas even if no reaction takes place between the ambient gas and the electrode active material or the electrical conducting material. As a result, the negative-electrode material thus obtained will have a composition significantly deviated from a target composition that the negative-electrode material is supposed to have. In order to prevent such a compositional deviation, it is preferable to employ the ambient pressure of not higher than $10^{-2}$ Pa, because no interaction is caused between the evaporated species and the ambient gas under this ambient pressure, which is a so-called molecular beam condition.

Further, it is preferable to employ an ultraviolet laser device as a laser device for the ablation. For example, a carbon dioxide gas laser device or the like emits a high-energy laser beam, and therefore, shows a high processing ability in producing the negative-electrode material. However, the laser beam of the carbon dioxide gas laser device is within an infrared region. If such a laser beam which is a heat ray component is thus employed, the laser beams causes a large temperature rise in a target irradiated with the laser beam. Accordingly, a part of elements or a part of components of a compound evaporates from the target having a multi-element composition. This makes it difficult to obtain the negative-electrode material having a desired composition. For this reason, it is preferable that the laser device is an ultraviolet laser device which emits a laser beam having a small heat ray component.

As is evident from Non-patent Literature 1, agglomeration and particle growth of the simple substance generated by the conversion reaction lead to loss of electrochemical activity, thereby causing the material to be unsuitable as a negative-electrode material of a secondary battery. It is required that the simple substance generated by the conversion reaction be in a form of fine particles (nanoparticles).

Although the agglomeration and particle growth of the simple substance generated by the conversion reaction are caused as a result of mass transfer, only lithium ions are diffusible in a lithium-ion conducting inorganic solid electrolyte. Accordingly, by employing a lithium-ion conducting inorganic solid electrolyte as the electrolyte, it is possible to suppress such agglomeration and particle growth. For this reason, it is preferable to employ a lithium-ion conducting inorganic solid electrolyte, as an electrolyte for a lithium secondary battery utilizing the negative-electrode material of the present invention.

According to the Examples below, a mixture ratio by weight between the electrical conducting material and the electrode active material is 1:2 to 1:100, and preferably, 1:5 to 1:50.

In a case where a ratio of the electrode active material is lower than the ranges above, a weight fraction or a volume fraction of the electrode active material is low in (i) an electrode material which is the mixture of the electrical conducting material and the electrode active material or (ii) an electrode obtained by shaping the electrode material. As a result, it becomes impossible to obtain a lithium battery having a high energy density.

In a case where a ratio of the electrode active material is higher than the ranges above, a content of the electrical conducting material is too low to give electronic conduction to the whole electrode. As a result, it is impossible to achieve a high coulombic efficiency in a first cycle.

The following describes the present invention in more detail, with reference to the Examples. However, the present invention is not limited, to the Examples.

EXAMPLES

Example 1

In the present example, $Li_2SiS_3$ was employed as a sulfide of an element which undergoes an alloying reaction with lithium, and FeS was employed as a sulfide having electronic conduction. Employed as a method for vaporizing $Li_2SiS_3$ and FeS was pulse laser ablation. A negative-electrode material was synthesized by solidifying, on a metal substrate, an evaporated species caused by the ablation, i.e., by pulsed laser deposition.

$Li_2SiS_3$ employed in the present example was produced in such a manner that lithium sulfide ($Li_2S$) and silicon sulfide were mixed at a molar ratio of 1:1 so that a reaction was caused therebetween by mechanical milling. Employed as FeS was a commercially-available reagent. FeS was mixed with $Li_2SiS_3$ by use of a ball mill so as to have a weight fraction of 10% in the mixture. By pressure forming, the mixture was formed into a disk-like shape having a diameter of 20 mm. The mixture was used as a target.

Employed as a method for solidifying the vaporized mixture was pulsed laser deposition.

A pressure condition in a film-formation chamber was maintained within a range of not lower than $10^{-6}$ Pa but not higher than $10^{-5}$ Pa. Employed as the pulsed laser was an excimer laser (laser wavelength: 248 nm) which utilizes Kr—F as an oscillation gas. The target was placed in the film-formation chamber. Then, the target was irradiated with the pulsed laser so that the mixture was evaporated. The mixture is then deposited on the metal substrate (stainless steel plate having a thickness of 0.1 mm) to a thickness of approximately 100 nm. Thus, obtained was such a negative electrode that a thin-film negative-electrode material was formed on the metal substrate.

The negative electrode was evaluated in terms of its electrode characteristic by causing a solid electrochemical cell provided with the negative electrode to charge and discharge at a constant current, where a solid electrolyte of the solid electrochemical cell was $Li_2S$—$P_2S_5$ glass ceramic.

The $Li_2S$—$P_2S_5$ glass ceramic was produced as below. A mixture made by mixing $Li_2S$ and $P_2S_5$ at a molar ratio of 7:3 was processed by mechanical milling by use of a planetary ball mill so that noncrystalline $Li_2S$—$P_2S_5$ was synthesized. The noncrystalline $Li_2S$—$P_2S_5$ was heated so as to be crystallized. By pressure forming, the $Li_2S$—$P_2S_5$ crystallized glass was formed into a disk-like shape having a diameter of 10 mm and a thickness of 1 mm. A two-electrode electrochemical cell was made in such a manner that: the $Li_2S$—$P_2S_5$ glass ceramic was used as an electrolyte layer; the negative electrode which serves as a working electrode was attached onto one surface by application of pressure; and a lithium-indium alloy which serves as a counter electrode (positive electrode) was attached to the other surface by application of pressure.

FIG. 1 shows constant-current charge and discharge curves of a sample thus obtained. Regarding each of graphs including FIG. 1 which show charge and discharge curves described herein, it should be noted that (i) the vertical axis shows a sum of a cell voltage and a potential of 0.62 V, which is the potential versus lithium metal electrode of a lithium-indium alloy electrode used as the counter electrode in order to present the potential of the negative electrode material as a cell voltage of a cell using a lithium metal as the counter electrode, and (ii) solid lines are charge and discharge curves in a first cycle; and dashed lines are charge and discharge curves in a second cycle. Main results thereof are summarized in Table 1.

TABLE 1

| Cycle | Current Direction | Potential plateau Avg. Voltage (V) | Electrical capacity (mAh/g) |
|---|---|---|---|
| 1 | Reduction | 0.7 | 1900 |
|   | Oxidation | 1.5 | 1400 |
| 2 | Reduction | 0.7 | 1400 |
|   | Oxidation | 1.5 | 1400 |

In a reduction process of the first cycle, the curve shows a potential plateau around 1.5 V. It is deduced that this potential plateau was caused due to the reaction of reducing $Li_2SiS_3$ and FeS used as the electrical conducting material so as to produce Si and Fe as simple substances. Then, the curve shows a gradual potential change within a range from 0 V to 1.0 V. It is considered that the reduction of $Li_2SiS_3$ to elemental silicon and the alloy formation from the elemental silicon with lithium took place in the range.

The current direction was reversed after an electrode potential reached 0 V. The curve as result of this shows a potential plateau at 2.5 V after showing a gradual potential change. In respective plateaus, the reaction of removing lithium from the lithium-silicon alloy to form elemental silicon, and re-oxidation of elemental silicon to a sulfide thereof took place.

An electrical capacity obtained as a result of a series of the conversion reaction and the alloying reaction was a very high value which was 2000 mAh/g per $Li_2SiS_3$. Further, a coulombic efficiency in the first cycle was a high value which was approximately 70%.

FeS employed as the electrical conducting material also undergoes a redox reaction near 2 V. However, in FIG. 1, an electrical capacity corresponding to a two-electron reaction was approximately 70 mAh/g only. Accordingly, it is clear that the potential plateau appeared around 2.5 V in the re-oxidation included the oxidation reaction of elemental silicon to a sulfide.

Example 2

A negative electrode was made in the same manner as Example 1 except that the negative-electrode material had a film thickness of 2600 nm. The negative electrode thus made was evaluated in terms of its electrode characteristic.

Figure 2:
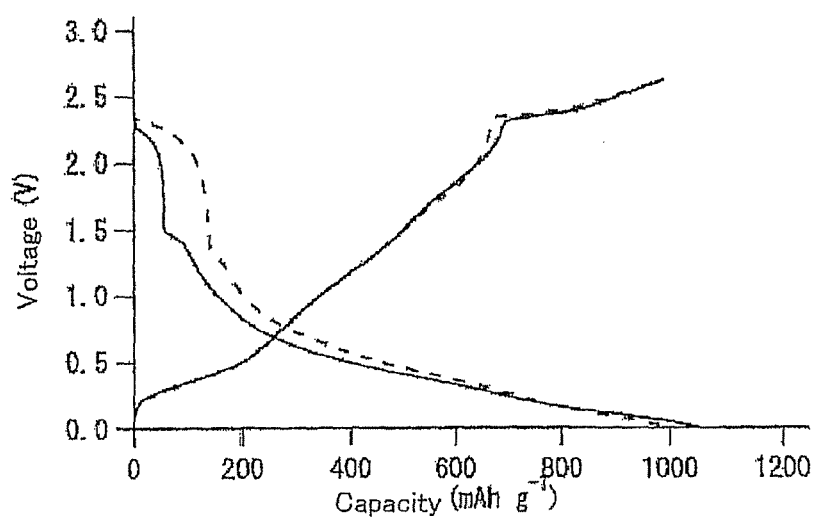
FIG. 2 shows charge and discharge curves of a negative-electrode material of Example 2 of the present invention.

Evaluation results are shown in FIG. 2 and summarized in Table 2.

As is evident therefrom, an electrical capacity per $Li_2SiS_3$ was smaller than that of Example 1 because a transportation distance of lithium ions and electrons was greater than that of Example 1. However, still, the electrical capacity was a sufficiently high value which was 1000 mAh/g. Further, a coulombic efficiency in the first cycle was a high value which was nearly 100%.

TABLE 2

| Cycle | Current Direction | Potential plateau Avg. Voltage (V) | Electrical capacity (mAh/g) |
|---|---|---|---|
| 1 | Reduction | 0.6 | 1100 |
|   | Oxidation | 1.3 | 1000 |
| 2 | Reduction | 0.7 | 1000 |
|   | Oxidation | 1.3 | 1000 |

Example 3

A negative electrode was made in the same manner as Example 1 except that instead of $Li_2SiS_3$ employed in Example 1, $SiS_2$ which was a commercially-available reagent was employed as a sulfide of an element which undergoes an alloying reaction with lithium, and the negative-electrode material had a film thickness of 700 nm. The negative electrode thus made was evaluated in terms of its electrode characteristic.

Figure 3:
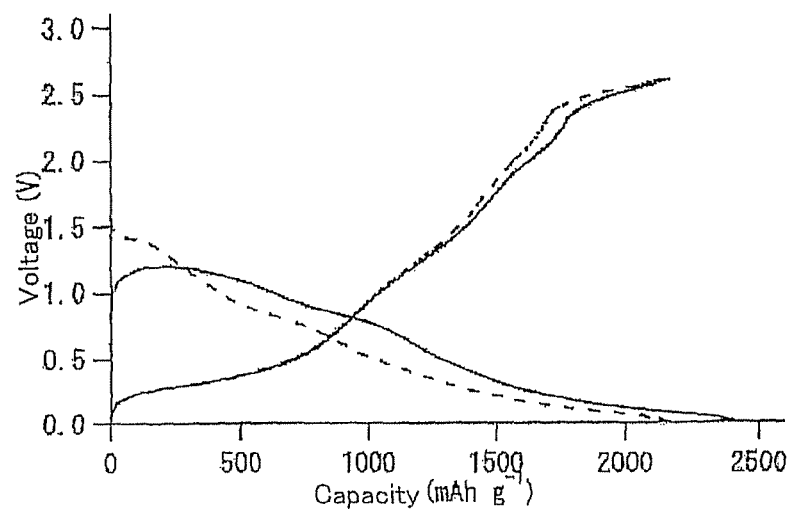
FIG. 3 shows charge and discharge curves of a negative-electrode material of Example 3 of the present invention.

Evaluation results are shown in FIG. 3 and summarized in Table 3.

As is evident therefrom, in the first cycle, a coulombic efficiency of the negative-electrode material of the present example was a high value which was 90%.

Further, an electrical capacity per weight of $SiS_2$ was also a high value which was 2400 mAh/g.

TABLE 3

| Cycle | Current Direction | Potential plateau | |
|---|---|---|---|
| | | Avg. Voltage (V) | Electrical capacity (mAh/g) |
| 1 | Reduction | 0.5 | 2400 |
| | Oxidation | 1.2 | 2200 |
| 2 | Reduction | 0.5 | 2200 |
| | Oxidation | 1.2 | 2200 |

Example 4

A negative electrode was made by adding FeS to $SiS_2$ in the same manner as Example 3 except that the negative-electrode material had a film thickness of 1500 nm. The negative electrode thus made was evaluated in terms of its electrode characteristic.

Figure 4:
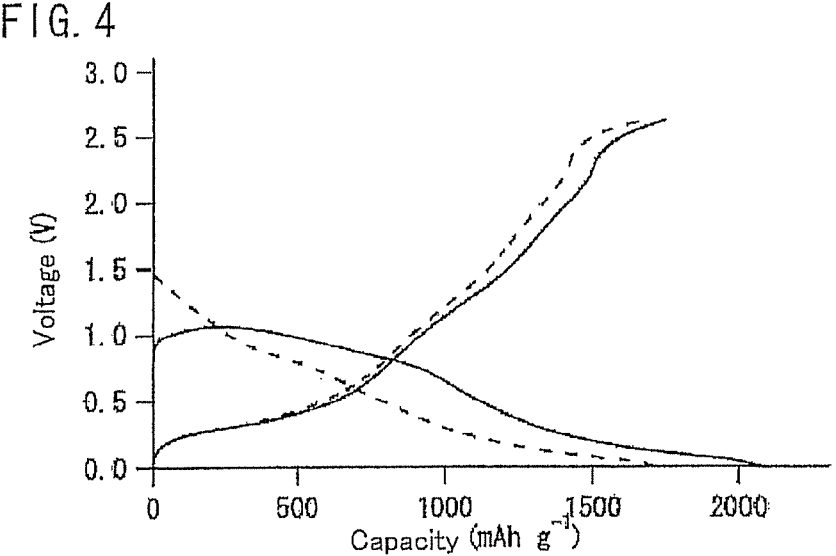
FIG. 4 shows charge and discharge curves of a negative-electrode material of Example 4 of the present invention.

Evaluation results are shown in FIG. 4 and summarized in Table 4.

As is evident therefrom, there was no significant change in charge and discharge behavior also in a case where the thickness of the negative electrode was increased to 1500 nm. It was accordingly found that the negative electrode obtained in the present example served as a high-electrical capacity negative electrode.

TABLE 4

| Cycle | Current Direction | Potential plateau | |
|---|---|---|---|
| | | Avg. Voltage (V) | Electrical capacity (mAh/g) |
| 1 | Reduction | 0.5 | 2100 |
| | Oxidation | 1.2 | 1700 |
| 2 | Reduction | 0.5 | 1700 |
| | Oxidation | 1.2 | 1700 |

Comparative Example 1

A negative electrode employing $Li_2SiS_3$ in the form of a powder as a sulfide of an element which undergoes an alloying reaction with lithium was examined as to whether or not the conversion reaction and the alloying reaction progress repeatedly and with a good cyclability. $Li_2SiS_3$ was synthesized in such a manner that lithium sulfide ($Li_2S$) and silicon sulfide ($SiS_2$) were mixed at a molar ratio of 1:1, and the mixture was then sealed in a silica tube under vacuum, and then heated to 700° C.

Figure 5:
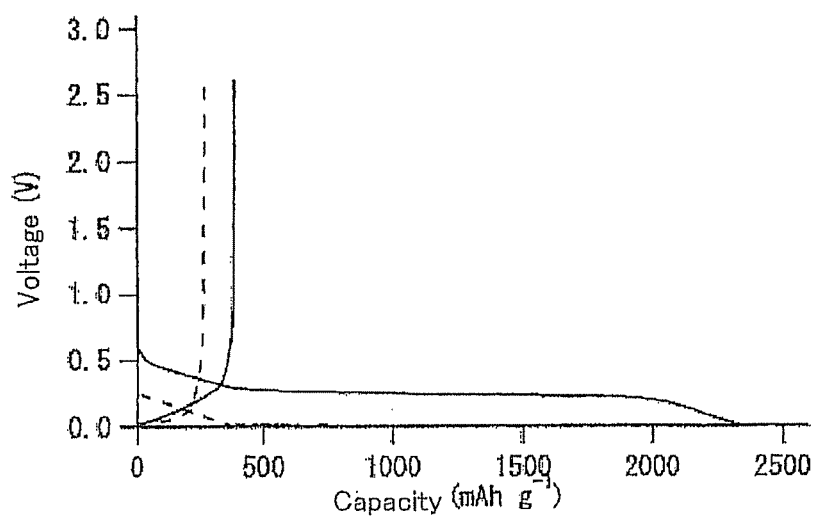
FIG. 5 shows charge and discharge curves of a negative-electrode material of Comparative Example 1 of the present invention.

A negative electrode was made by mixing, at a ratio by weight of 1:1, $Li_2SiS_3$ thus synthesized and $Li_2S$—$P_2S_5$ glass ceramic employed as a solid electrolyte. The negative electrode thus made was evaluated in terms of its electrode characteristic in the same manner as above. Evaluation results are shown in FIG. 5 and summarized in Table 5.

As is evident therefrom, although a high electrical capacity was observed in a reduction process in a first cycle, a coulombic efficiency in the first cycle was a low value which was 20% or less. In a subsequent charge and discharge cycle, obtained capacities were extremely small. Further, unlike in Examples 1 to 4, the curve does not have the potential plateau around 2.5 V which plateau indicates the re-oxidation of elemental silicon to a sulfide thereof. It was accordingly found that the negative electrode of the present comparative example did not have a high cyclability of the conversion reaction and the subsequent alloying reaction.

TABLE 5

| Cycle | Current Direction | Potential plateau | |
|---|---|---|---|
| | | Avg. Voltage (V) | Electrical capacity (mAh/g) |
| 1 | Reduction | 0.3 | 2300 |
| | Oxidation | 0.2 | 400 |
| 2 | Reduction | 0.2 | 700 |
| | Oxidation | 0.2 | 300 |

Comparative Example 2

For the purpose of examination of an effect of addition of the electrical conducting material to a powder sample, a negative electrode was made by adding, to $Li_2SiS_3$ employed in Comparative Example 1, FeS as a sulfide having electronic conduction. The negative electrode thus made was evaluated in terms of its electrode characteristic.

Figure 6:
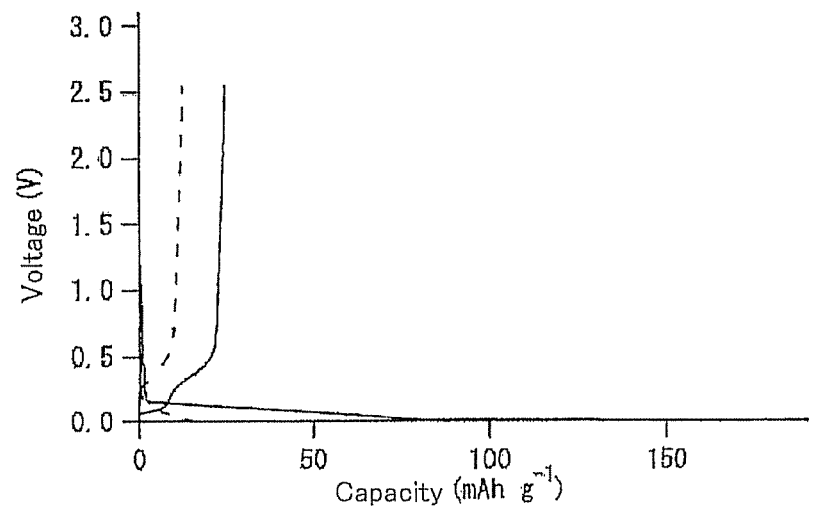
FIG. 6 shows charge and discharge curves of a negative-electrode material of Comparative Example 2 of the present invention.

An amount of FeS added to $Li_2SiS_3$ was 10% by weight. $Li_2SiS_3$ and FeS was mixed by use of a planetary ball mill in order that a distribution of the electrical conducting material becomes as uniform as possible. The mixture was evaluated in terms of its electrode characteristic in the same manner as the first comparative example. Evaluation results are shown in FIG. 6 and Table 6.

As is evident therefrom, obtained were extremely small capacities. Further, a coulombic efficiency in a first cycle was merely approximately 30%. Furthermore, potential plateaus were not observed near 2.5 V which potential plateaus indicate re-oxidation of elemental silicon to a sulfide.

It was accordingly found that the sample which did not go through a gaseous state could not achieve a high coulombic efficiency in the first cycle even in a case where employed was the mixture of (i) a sulfide of an element which undergoes an alloying reaction with lithium and (ii) a sulfide having electronic conduction.

TABLE 6

| Cycle | Current Direction | Potential plateau | |
|---|---|---|---|
| | | Avg. Voltage (V) | Electrical capacity (mAh/g) |
| 1 | Reduction | 0.2 | 80 |
| | Oxidation | 0.3 | 20 |
| 2 | Reduction | 0.2 | 20 |
| | Oxidation | 0.4 | 10 |

Comparative Example 3

The present comparative example employed $SiS_2$ in the form of a powder as a sulfide of an element which undergoes an alloying reaction with lithium, so as to examine whether or not the conversion reaction and the alloying reaction progress repeatedly and with a good cyclability.

Figure 7:
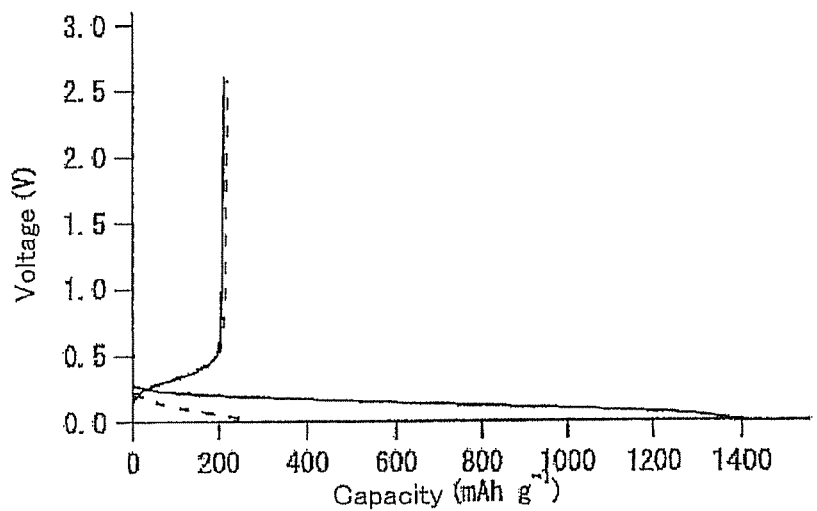
FIG. 7 shows charge and discharge curves of a negative-electrode material of Comparative Example 3 of the present invention.

Employed as $SiS_2$ was a commercially-available reagent. A negative electrode thus made with the commercially-available reagent was evaluated in terms of its electrode characteristic in the same manner as the first comparative example. Evaluation results are shown in FIG. 7 and Table 7.

As is evident therefrom, a coulombic efficiency in a first cycle was a small value which was approximately 15%. Furthermore, no potential plateau was observed around 2.5 V which plateau indicates the re-oxidation of the elemental silicon to a sulfide.

TABLE 7

| Cycle | Current Direction | Potential plateau Avg. Voltage (V) | Electrical capacity (mAh/g) |
|---|---|---|---|
| 1 | Reduction | 0.2 | 1400 |
|   | Oxidation | 0.3 | 200 |
| 2 | Reduction | 0.1 | 200 |
|   | Oxidation | 0.3 | 200 |

Comparative Example 4

Figure 8:
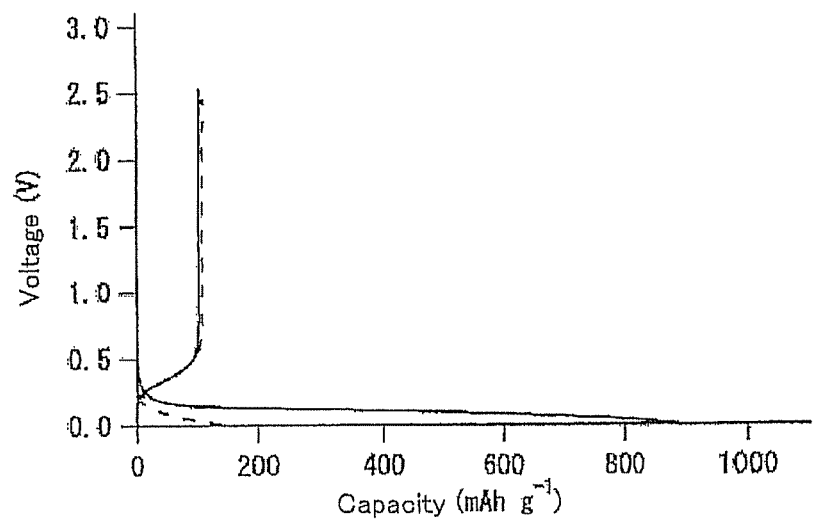
FIG. 8 shows charge and discharge curves of a negative-electrode material of Comparative Example 4 of the present invention.

For the purpose of examination of an effect of addition of the electrical conducting material to that $SiS_2$ of Comparative Example 3 in the form of a powder, a negative electrode was made by adding, to the $SiS_2$ by 5% by weight, FeS as a sulfide having electronic conduction. Evaluation results are shown in FIG. 8 and Table 8.

As is evident therefrom, in a first cycle, a coulombic efficiency of the negative electrode was a low value which was approximately 10%. It was accordingly found that the sample which did not go through a gaseous state could not achieve a high coulombic efficiency in the first cycle even in a case where employed was the mixture of (i) a sulfide of an element which undergoes an alloying reaction with lithium and (ii) a sulfide having electronic conduction.

TABLE 8

| Cycle | Current Direction | Potential plateau Avg. Voltage (V) | Electrical capacity (mAh/g) |
|---|---|---|---|
| 1 | Reduction | 0.2 | 900 |
|   | Oxidation | 0.3 | 100 |
| 2 | Reduction | 0.2 | 150 |
|   | Oxidation | 0.3 | 100 |

Comparative Example 5

Figure 9:
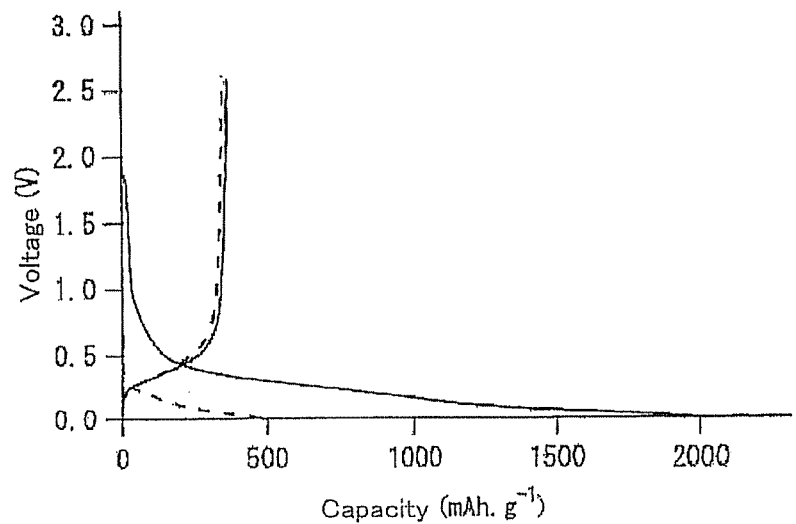
FIG. 9 shows charge and discharge curves of a negative-electrode material of Comparative Example 5 of the present invention.

In the present comparative example, metal silver which has a high electronic conduction was employed as an electrical conducting material to be added to a sulfide of an element which undergoes an alloying reaction with lithium. The addition of metal silver aimed to increase the electronic conduction inside the negative electrode as high as possible. Further, an additive amount of a metal silver powder was 30% by weight. Evaluated was an effect of the addition thereof on increase in coulombic efficiency in a first cycle. Evaluation results are shown in FIG. 9 and Table 9.

As is evident therefrom, in the first cycle, a coulombic efficiency could not exceed 20%. It was accordingly found that the use of the sample which did not go through the gaseous state could not achieve a high coulombic efficiency in the first cycle even if the electrical conducting material was employed.

TABLE 9

| Cycle | Current Direction | Potential plateau Avg. Voltage (V) | Electrical capacity (mAh/g) |
|---|---|---|---|
| 1 | Reduction | 0.3 | 2000 |
|   | Oxidation | 0.4 | 400 |
| 2 | Reduction | 0.2 | 500 |
|   | Oxidation | 0.4 | 400 |

Comparative Example 6

In the present comparative example, an electrode material was made in such a manner that the evaporated sample was solidified from a gaseous state, without addition of an electrical conducting material to a sulfide of an element which undergoes an alloying reaction with lithium. The electrode material thus made was evaluated in terms of its characteristic.

Figure 10:
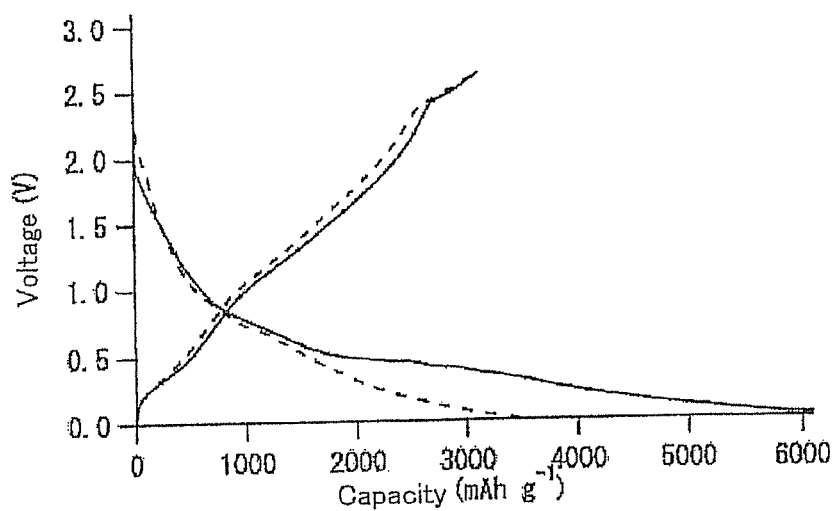
FIG. 10 shows charge and discharge curves of a negative-electrode material of Comparative Example 6 of the present invention.

A $Li_2SiS_3$ thin film was formed with a thickness of 25 nm in such a manner that an evaporated species was solidified from a gaseous state by the pulsed laser deposition in the same manner as Example 1 except that the evaporated species was $Li_2SiS_3$ containing no FeS. The negative-electrode material thus made was evaluated in terms of its electrode characteristic in the same manner as Example 1. Evaluation results are shown in FIG. 10 and Table 10.

TABLE 10

| Cycle | Current Direction | Potential plateau Avg. Voltage (V) | Electrical capacity (mAh/g) |
|---|---|---|---|
| 1 | Reduction | 0.5 | 6000 |
|   | Oxidation | 1.3 | 3300 |
| 2 | Reduction | 0.6 | 3400 |
|   | Oxidation | 1.3 | 3300 |

As is evident therefrom, a coulombic efficiency in the first cycle was approximately 50%. This is lower than that of the negative-electrode material of Example 1 which was made by adding, to $Li_2SiS_3$, FeS as a substance having electronic conduction.

Comparative Example 7

A $Li_2SiS_3$ thin film containing no FeS was formed in the same manner as Example 6 except that the $Li_2SiS_3$ thin film had a film thickness of 1000 nm.

Figure 11:
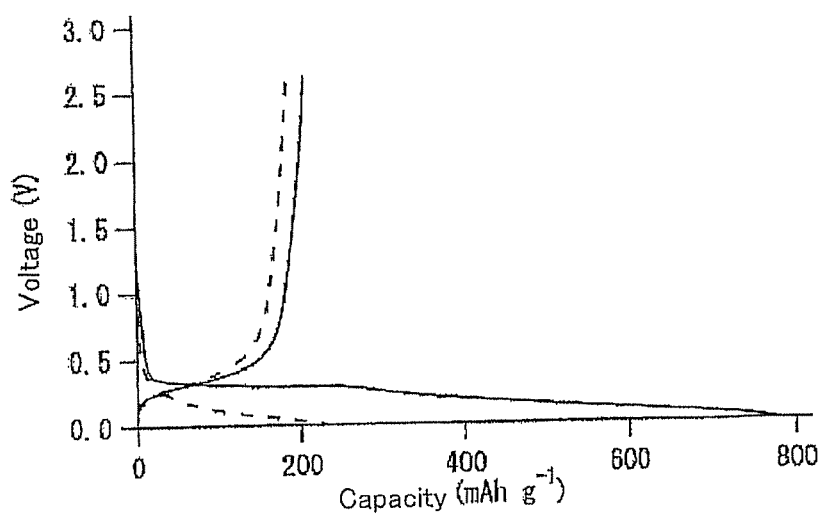
FIG. 11 shows charge and discharge curves of a negative-electrode material of Comparative Example 7 of the present invention.

A negative electrode thus made with the $Li_2SiS_3$ thin film was evaluated in terms of its characteristic in the same manner as Example 1. Evaluation results are shown in FIG. 11 and Table 11.

As is evident therefrom, a coulombic efficiency in the first cycle was 25% which is further lower than that of Comparative Example 6. Further, the potential plateau due to the re-oxidation of the elemental silicon to a sulfide was not found on the curve. That is, it was found that in a case where no electrical conducting material was added, an electron transport in the negative electrode limited a rate of the electrode reaction as film thickness increases, even if the evaporated sample was solidified from a gaseous state. This severely deteriorated, the cyclability of the conversion reaction and the alloying reaction with lithium.

TABLE 11

| Cycle | Current Direction | Potential plateau | |
|---|---|---|---|
| | | Avg. Voltage (V) | Electrical capacity (mAh/g) |
| 1 | Reduction | 0.3 | 800 |
| | Oxidation | 0.4 | 200 |
| 2 | Reduction | 0.2 | 200 |
| | Oxidation | 0.4 | 200 |

The present invention is based on (i) the finding that a low coulombic efficiency in a first cycle is caused by lack of electronic conduction in the negative-electrode material, and (ii) development of a measure for effectively giving electronic conduction to the negative-electrode material.

In the case of the electrode reaction of silicon sulfide for example, in a reduction process in a first cycle, silicon sulfide which is an insulating material is converted by the conversion reaction to the elemental silicon which is a semiconductor, and further the elemental silicon is converted by the alloying reaction to a lithium-silicon alloy which has metallic conduction.

That is, electronic conduction in a substance is increased in the reduction process. Then, in a re-oxidation process in charging, the lithium-silicon alloy generated in the reduction process is re-oxidized to the elemental silicon and silicon sulfide.

In other words, an alloy which exhibits metallic conduction is changed to a semiconductor, and further changed to an insulating material. Accordingly, electronic conduction in a substance is decreased. This makes it difficult to transport electrons for causing an electrode reaction. Accordingly, the lithium-silicon alloy thus generated by reduction cannot be entirely re-oxidized back to the initial silicon sulfide. Thus, the electrode reaction ends. In other words, a coulombic efficiency in the first cycle is very low, and therefore, such a negative electrode has a difficulty in serving as a high-electrical capacity negative electrode of a lithium secondary battery.

As a prevention countermeasure to such decrease in coulombic efficiency in a first cycle due to lack of electronic conduction, it is conceivable that a substance having electronic conduction (electrical conducting material) is added to an electrode active material. However, according to a method in which an electrode active material and an electrical conducting material are mixed by use of a mortar or a ball mill, the electrical conducting material merely has a sparse distribution in a negative electrode. Accordingly, there is a problem in that the negative electrode still has a low coulombic efficiency in its portion which is away from where the electrical conducting material is contained.

In view of this, the inventors of the present invention considered that an electron transportation distance can be reduced by thinly forming an electrode active material on an electrical conducting material, and this prevents inhibition of an electrode reaction due to lack of electronic conduction. By use of an electrode material such as a thin film of silicon sulfide, the inventors examined that range of thicknesses of an electrode material layer which allows a high coulombic efficiency in a first cycle. As a result, the inventors of the present invention found that the range corresponds to several tens of nanometers.

Thus, by forming an electrode active material to a thickness of several tens of nanometers on an electrical conducting material, it is possible to realize an electrode material which causes a conversion reaction and an alloying reaction with a high repeatability. However, an electrical conducting material which is usually employed for an electrode of a lithium battery is a carbon-fiber material or the like such as acetylene black. Such a carbon-fiber material usually has a particle size in a range of from several tens of nanometers to several micrometers. In a case where an electrode active material layer is formed to a thickness of several tens of nanometers on such an electrical conducting material, the electrical conducting material occupies a high proportion in a negative electrode. This results in a very low electrical capacity for an electrode although an electrical capacity per weight of an active material is high.

On the basis of the consideration, the inventors of the present invention arrived at a conclusion that in order to achieve a high coulombic efficiency and a high energy density in the first cycle, it is necessary to mix an electrode active material and an electrical conducting material at a level of nanometers. Accordingly, the inventors of the present invention obtained a measure for realizing such mixing, thereby achieving the present invention. According the present invention, a mixture of an electrical conducting material and an electrode active material is vaporized, and a mixture gas thus obtained is solidified. It is considered that this makes it possible to mix the electrical conducting material and the electrode active material at an atomic level, without loss of respective original functions. However, an organization structure of the mixture has not been clarified as of this moment.

By use of this mechanism, the inventors of the present invention succeeded in giving electronic conduction to the whole electrode, without increase in volume fraction of the electrical conducting material. Further, a negative-electrode material of the present invention is arranged such that: the electrical conducting material is a sulfide having electronic conduction; and the electrode active material is a sulfide of an element which undergoes the alloying reaction with lithium.

Further, a negative-electrode material of the present invention is arranged such that the element which undergoes the alloying reaction with lithium is silicon.

Further, a negative-electrode material of the present invention is arranged such that a ratio by weight between the electrical conducting material and the electrode active material is 1:5 to 1:50 in the mixture material.

Further, a negative-electrode material of the present invention is arranged such that said lithium-ion conducting electrolyte is a lithium-ion conducting inorganic solid electrolyte.

Further, a method of the present invention for producing a negative-electrode material is arranged such that the step of solidifying the mixture thus vaporized includes contacting the vaporized mixture with a substrate for the negative electrode so that the mixture is solidified on the substrate.

A method of the present invention is arranged such that the step of vaporizing the mixture is carried out by pulse laser ablation.

Industrial Applicability

Conventional lithium-ion batteries are batteries which utilize $LiCoO_2$ as their positive-electrode active material and utilize a carbon material as their negative-electrode active material. Both of these electrode active materials are intercalation materials. An intercalation material is such a material that an insertion reaction and a deinsertion reaction of a guest into/from a host phase are utilized as electrode reactions. Accordingly, the intercalation material undergoes a high repeatability. On the other hand, an electrical capacity density of the intercalation material is limited by a weight and a volume of the host phase. Therefore, an innovative increase in energy density of lithium batteries cannot be expected, provided that intercalation materials are used as electrode active materials.

Conversion electrodes and lithium alloy electrodes are under study as those expected to serve as high-electrical capacity negative electrodes without limitations of an intercalation reaction. The negative-electrode material of the present invention can utilize both a conversion reaction and an alloying reaction as an electrode reaction. Accordingly the negative-electrode material of the present invention can generate an electrical capacity density which is further hither than those of the high-electrical capacity negative electrodes. Therefore, the negative-electrode material of the present invention is applicable to that lithium battery with a high energy density which is demanded as lithium batteries for portable electronic devices or electric vehicles.

The invention claimed is:

1. A negative-electrode material for a lithium battery comprising a mixture of:
   (i) an electrical conducting material having electronic conduction, wherein the electrical conducting material consists of a sulfide; and
   (ii) an electrode active material comprising a sulfide of an element, wherein the electrode active material can be reduced via a conversion reaction to the element, and further wherein the element can under go an alloying reaction with lithium; and
   wherein the negative-electrode material is capable of charging and discharging through the conversion reaction and the alloying reaction with lithium.

2. The negative-electrode material as set forth in claim 1, wherein the element is silicon.

3. The negative-electrode material as set forth in claim 1, wherein a ratio by weight between the electrical conducting material and the electrode active material is 1:5 to 1:50 in the mixture material.

4. A lithium secondary battery comprising:
   a negative electrode;
   a positive electrode; and
   a lithium-ion conducting electrolyte provided between said negative electrode and said positive electrode,
   wherein said negative electrode comprises the negative-electrode material as set forth in claim 1.

5. The lithium secondary battery as set forth in claim 4, wherein said lithium-ion conducting electrolyte is a lithium-ion conducting inorganic solid electrolyte.

* * * * *